Patented Jan. 1, 1952

2,580,409

UNITED STATES PATENT OFFICE 2,580,409

PROCESS FOR TREATING TIDAL LANDS SUBJECTED TO SEWAGE

Robert E. Cornish, Berkeley, Calif.

No Drawing. Application December 6, 1947, Serial No. 790,243

5 Claims. (Cl. 210—2)

The invention relates to sewage treatment processes, and more particularly to chemical treatment of sewage to eliminate objectionable gases such as hydrogen sulphide.

Modern sewage disposal accumulating large amounts of semi-liquid sewage with a large proportion of organic materials and discharging from sewer outfalls into rivers and other bodies of water, including those subject to tidal action, produces, especially in the case of discharge on to tidal flats, general pollution and offensive and destructive products of the decomposition of the sewage effluvium including among others hydrogen sulphide. The production of hydrogen sulphide is particularly aggravated in the case of the discharge of sewage on to tidal flats adjoining sea water as a result of the interaction between organic reducing substances in the sewage and sulphates in the saline waters, although this same condition obtains to varying extents in the discharge of sewer into any body. Sulphates are reduced to the obnoxious sulphides by bacterial action in the presence of the sewage which serves as food for the micro-organisms. This gaseous product of the decomposition of organic sewage materials is tenacious and difficult to dispel, being produced over a period of time by the accumulated sewage sludge, bubbling to the surface and carried in its gaseous state over adjoining cities. In addition to the noxious odor characteristic of hydrogen sulphide and associated in many municipalities with areas of sewage disposal, it has a highly destructive effect upon paint and painted structures. The hydrogen sulphide combines with the lead constituents in most exterior paints to produce lead sulphide, evidenced by unsightly grayish to black blotching and streaking of the paint, accompanied by efflorescence and gradual destruction of the paint pigment and vehicle. The eventual destruction of the paint is hastened by the leaching out of dilute sulphuric acid from the lead sulphide contaminate of the paint by fogs or winter rains, leaving either a totally bare wall surface or a flaked, chalky and fragile paint covering.

Additionally, the production of hydrogen sulphide by the decomposing sewage and sludge creates a highly corrosive acid condition destructive of sewers and sewage installations, with a much more rapid destruction of the sewage conduit, especially concrete and most metallic portions thereof than would be the case were the sewage reduced to non-volatile elements.

Many methods for the elimination of the hydrogen sulphide product of sewage, and for control of the damage to paint by the reaction of hydrogen sulphide with the lead constituent thereof to convert the latter to lead sulphide, including the elimination of lead in exterior paints, and the maintenance of a dry condition on the paint inhibiting the lead sulphide reaction have been proposed. For the elimination of the hydrogen sulphide itself rather than the prevention of its effect upon paint more elaborate methods have been advanced and used heretofore. In addition to the use of expensive sewage disposal plants, including settling pools, drying and desiccating facilities, and the pumping of light liquid effluvium to deep water areas, elimination of hydrogen sulphide has been sought by exposing the decomposing material to free oxygen, as by aerating the water into which the sewage is discharging or by pumping air under pressure directly into the sewage line; and by propagation of certain bacteria, including the so-called "purple" bacteria which convert by a process similar to photosynthesis sulphur from hydrogen sulphide; but this latter method has the disadvantage of requiring a fairly stable water level to prevent the organisms from being washed away from the sewage discharge area. Chemical treatments have also been widely used, including the subjecting of the decomposing sewage to liquid chlorine, sodium hypo-chlorite, sodium hydroxide and soluble zinc and soluble iron salts. Additionally, activated charcoal has been used as an absorbing agent for the gaseous products of decomposition. Each of these methods is prohibitively expensive when a sewage outfall of several million gallons per day must be treated, and additionally requires more or less elaborate treating plants for injection of the treating substance into the sewage and retention in intimate contact therewith for a sufficient interval to remove the potential to produce hydrogen sulphide.

In the sewage accumulating and disposal system wherein sewage is fed by conduits from various parts of a city to an outfall at a river, lake or other relatively large body of water, there is a certain amount of hydrogen sulphide generated within the sewage conduits. This is, of course, well understood and has in certain instances been treated. However, what has apparently not been so well understood is that a relatively greater amount of hydrogen sulphide is released after the sewage has been discharged from the outfall due to the inter-action of the organisms made in the sewage with sulphates in the body of water to which the sewage is received. This latter reaction is a relatively slow one and continues over a substantially long period of time, in the order of weeks or months, on tidal flats and other land boundaries adjacent the sewer outfall. It is in connection with the elimination of this latter source of hydrogen sulphide that chemical processes heretofore suggested have wholly failed. This has been due very largely to the fact that soluble chemicals of the type above mentioned have been introduced into the sewer conduits. These chemicals are affected to react with and destroy the hydrogen sulphide which is generated within these conduits. Upon discharge into a large body of water, however, such soluble chemicals are rapidly dissipated and are therefore not available to thereafter react with the hydrogen sulphide which is subsequently generated as above described.

It is therefore an object of the present invention to provide a process for the treatment of sewage which will inhibit the production of hydrogen sulphide not only within the sewer conduit system itself, but will also inhibit and effectively control the more important secondary generation of hydrogen sulphide in the receiving body of water.

Another object of the present invention accordingly is to provide an inexpensive process for the treatment of raw sewage which will effectively control the release of hydrogen sulphide therefrom without requiring any alterations in or addition to existing sewage disposal conduits and systems, and utilizing one of the most readily available, durable and inexpensive chemical compounds.

Again an object of the invention is to treat by catalytic action the decomposing sewage effluvium, whereby the catalytic agent will not in itself be consumed in the process of destruction of products of decomposition but will serve substantially indefinitely until removed by mechanical means to maintain a "sweet" decomposition free of hydrogen sulphide gas.

Another object of the present invention is to permit oxidation of the decomposing sewage matter by the free oxygen in water and the atmosphere by providing a catalytic agent, whereby the process of purification of and decomposition of the sewage discharge may be carried on freely on tidal flats or other areas subject to ebb and flow, without the removal thereby of any substantial part of the catalytic agent.

A further object of the present invention is to provide a process of treatment of tidal flats and other land boundaries adjoining bodies of water into which sewage is discharged for inhibiting the production and release from such land boundaries and other obnoxious gases such as hydrogen sulphide.

The invention possesses other objects and features of advantage, some of which, with the foregoing, will be set forth in the following description of the preferred form of the invention. It is to be understood, however, that variations in the process as described hereunder may be adopted within the scope of the invention as set forth in the claims.

In accordance with the present invention the sewage is exposed to, preferably by admixing with, a catalytic agent which promotes the oxidation of hydrogen sulphide into harmless and inoxious forms. As an important feature of the present invention, I use for this purpose iron or an insoluble iron salt which is capable of reacting with the hydrogen sulphide to produce iron sulphide which in turn reacts the oxygen contained in the water or the atmosphere to reconstitute an iron compound which in turn will again react with the hydrogen sulphide. Thus the original iron or insoluble iron salt will go into and out of the chemical processes to on each cycle combine with and destroy hydrogen sulphide so long as and as rapidly as hydrogen sulphide is generated. In this manner the iron product, which is added to the sewage in accordance with the present invention, functions as a catalyst in that it is not in itself consumed and accordingly the present process may be referred to as the catalytic oxidation of hydrogen sulphide.

Either iron in its metallic form, such as scrap iron which is readily available in most municipal dumps or a large number of insoluble iron salts or compounds may be used. When metallic iron is used to act upon the hydrogen sulphide, I believe that its beneficial effect is due to the iron oxide which results from corrosion and oxidation of the iron. Therefore, I prefer to use iron in relatively thin sheets or pieces to facilitate oxidation. Tin-plated iron cans, de-tinned plate, iron turnings from machine shops, waste stampings from sheet-metal fabrication, and similar iron and steel waste are plentiful in many cities, and if this waste is dumped into the ocean, bay, river, or other waters at or near sewage discharge outlets the iron oxides formed tend to catalytically oxidize or decompose the obnoxious hydrogen sulphite produced by the sewage.

Among insoluble iron salts or compounds which may be used are iron oxide, iron carbonate, iron hydroxide or other various mixed iron compounds including basic chlorides or basic carbonates, iron sulphides including iron pyrite in either ferric or ferrous forms or mixtures thereof. The class of iron or iron compounds may be characterized for the purposes of the present invention as being normally classed as insoluble in water and which has a specific gravity somewhat higher than either the water or the organic mass contained in the sewage and which will react with hydrogen sulphide to form an iron sulphide. Accordingly, the introduction of such an agent into the sewage conduit will be effective to effectively remove the hydrogen sulphide therein and will flow with the sewage into the receiving body of water where the agent by reason of its relative insolubility will gravitate to the floor or bottom of the water immediately adjacent the sewer outfall where the agent remains and is available for interaction with the secondary generation of hydrogen sulphide above described. The reaction with these ferrous agents with hydrogen sulphide produces, as above noted, an iron sulphide which is likewise relatively insoluble in the water and therefore remains adjacent the sewer outfall. I have found that even a small amount of oxygen, such as contained in bodies of water, is effective to change the iron sulphide so produced to iron oxide or iron hydroxide or the like which is again immediately available for reaction with hydrogen sulphide which may be subsequently present. Where the sewer outfall is located on tidal land such as at an ocean or a body of water connected thereto, the iron agent as admixed with the sewage or its converted iron sulphide form is disposed on such tidal land and during low tide is in contact with the atmosphere where there is, of course, an abundant supply of oxygen to reconstitute the iron sulphide to an oxide or hydroxide form. Usually the secondary generation of hydrogen sulphide is most pronounced during periods of low tide and it is precisely during this period that the iron agent herein described is most effective in controlling the release of hydrogen sulphide.

Of the various iron agents above mentioned, I prefer to use iron oxide because of its ready availability and cheapness as well as being ideally suited for easy pulverizing into most efficient particle sizes. For the present process a pure form of iron oxide is not required since large quantities of adulterants, even including sulphur adulterants, will not seriously impair its operation. The iron oxides constitute one of the most common minerals and are obtained commercially readily and inexpensively. The iron oxide to be most effective is reduced to a pulverized consistency, but for certain applications, as will be more fully hereinafter described, the iron oxide aggregate may range in size upwardly from a flour like consistency to particles several inches in diameter. When using iron oxide the reaction of the hydrogen sulphide to iron sulphide is substantially in accordance with the following chemical reaction, the ferric form of iron being here used for purposes of illustration:

$$3H_2S + Fe_2O_3 = Fe_2S_3 + 3H_2O$$

The iron sulphide thus produced in turn reacts with the oxygen in the water or the atmosphere so as to reconstitute the iron oxide or an iron hydroxide in accordance with substantially the following equation:

$$2Fe_2S_3 + 3O_2 = 6S + 2Fe_2O_3$$

While it is probable that there are a number of side reactions, depending upon the presence of other products in the sewage and the water, the important result is that the iron sulphide is reconverted to iron oxide, hydroxide or other essentially similar form capable of again reacting with the hydrogen sulphide and that at all stages of the process the iron agent remains substantially insoluble in the water and is therefore not dissipated in the large water mass in which it operates.

Where the common sewage disposal condition is found of the sewage outfall conduit leading to below high water mark on a tidal waterway or estuary, and being exposed on the tidal flat at low tide, the iron oxide is preferably distributed over the tidal flat and the adjoining water area adjacent the sewage outfall, by being dumped from the shore line or by depositing from low draft lighters. The iron oxide being of a much higher specific gravity than the sewage constituents is not readily removed by the ebb and flow and wave action of the tidal waters, but is distributed more uniformly over the ground by such ebb and flow, and one treatment, depending upon the mechanical conditions, is sufficient for from several months to a year or longer. Additionally, the particles of iron oxide sink into the sludge composing the tidal flat and undersea bottom, and continue to operate as catalytic agents upon the buried effluvium which would otherwise produce hydrogen sulphide gas with its characteristic bubbling at the surface.

Where it is not convenient to treat the sewage adjacent the outfall, or where it is desired to prevent the production of hydrogen sulphide gas as soon as possible in the sewage accumulator to reduce odor and corrosion of the conduit, the powdered iron oxide is ideally introduced into the sewage conduit through common manholes or other means of entrance and egress normally provided; the catalytic reaction is initiated immediately maintaining the length of the conduit free from hydrogen sulphide and "sweetening" the raw sewage; the oxide is also carried by the sewage flow to the discharge outlet which may be otherwise substantially inaccessible from the surface of the water into which the conduit discharges.

The proportions of iron oxide to sewage are not critical, a satisfactory test of sufficiency being that of smelling the air adjacent the sewage outfall or smelling samples of the sewage sludge to detect the presence of hydrogen sulphide therein. Any excess of the iron oxide is simply unused in the reaction until such time as demand occasioned by the production of hydrogen sulphide draws into the reaction the remaining particles of iron oxide. I have found that the distribution of iron oxide over the tidal flat or other land boundary to a body of water receiving the sewage of approximately two-thirds of an ounce of iron oxide per square foot to be effective. This latter concentration of iron concentration oxide is about minimum and a greater concentration is, of course, harmless and probably somewhat more effective in the control of hydrogen sulphide. In arriving at the desirable minimum concentration of iron oxide, and in order to test the efficacy of the process, several five gallon buckets were filled substantially half full of sludge removed from the tidal flats near the mouth of a sewer in Berkeley, California. The buckets were then covered with steel covers having rubber gaskets forming a fairly tight seal with the walls of the buckets. Tests were then made of the atmosphere within the covered buckets which indicated a concentration of approximately 25 parts per million of hydrogen sulphide by volume in the air space above the sludge.

Various amounts of finely powdered (200 mesh per inch) ferric oxide were then sprinkled over the top surface of the sludge in some of the buckets. Within two hours after the application of the iron oxide to the sludge, the atmospheric contamination by hydrogen sulphide upon tests had dropped from 25 parts per million of hydrogen sulphide to less than one part per million of hydrogen sulphide per volume in the air space above the sludge so treated with approximately ⅔ of an ounce of a powdered iron oxide. Untreated buckets, after the two hour interval, however, indicated a fairly stable contamination of approximately twenty-five parts per million of hydrogen sulphide in the air spaced above the sludge. The reaction of the iron oxide with the hydrogen sulphide to oxidize the latter appears to be principally a surface action, as hydrogen sulphide is apparently still present in the deeper layers of the sludge, being substantially removed adjacent the surface. Hydrogen sulphide gas bubbles rising in the sludge appear to be dissolved and destroyed in the top layer of sludge if sufficient iron oxide is present at the surface thereof, assuming a minimum amount of oxygen in the atmosphere or water overlying the sludge. Some of the iron oxide in these tests was a purified powder, whereas other of the iron oxide utilized was a flue dust secured from a sulphuric acid works as a waste product of the burning of iron pyrite which flue dust was said to contain up to 6% sulphur. However, both of the purified and the contaminated forms of iron oxide appeared equally effective in the reduction of hydrogen sulphide in the decomposing sewage sludge.

In order to test the process on a full size sewage treatment, a sewer was selected at the foot of Virginia Street, in the city of Berkeley, California, which sewer is of concrete construction, approximately six feet inside diameter and discharging approximately one million gallons of sewage per day under normal load conditions when not increased by storm waters. The latter are not voluminous during hot weather when hydrogen sulphide production is at a maximum. This sewer, commonly known as "The Virginia Street Sewer" discharges into San Francisco Bay, and the outlet is completely covered at higher high tides and completely uncovered at lower low tides. The discharge outlet is situated at the apex of a V formed by two rock walls intersecting at an angle of approximately 60°, one wall jutting out in a westerly direction to a distance of about one-quarter of a mile, and the other wall projecting in a northwesterly direction for about 400 feet, the bay waters being confined in the acute angle defined by the intersecting walls. The sewer discharge is therefore confined in a somewhat enclosed arm or bayou of San Francisco Bay, and is substantially isolated from free circulation of bay waters, which isolation accelerates the production of hydrogen sulphide by inhibiting optimum oxygenation which occurs under conditions of free currents and water movement of the bay. Computed as a triangle from the dimensions above, the isolated area is about 450,000 square feet in extent, and computing the amount of iron oxide necessary to treat this area on the basis of two-thirds ounce per square foot found to be sufficient in the sludge buckets indicates a requirement of approximately ten tons of iron oxide. However, this figure would need to be increased for a semi-permanent treatment, since the iron oxide is subject to mechanical disturbance, and being lost and dissipated through tidal action and storm waves. Furthermore, the production of hydrogen sulphide is not uniform throughout the area, being concentrated adjacent the sewage discharge, and the total water front area producing hydrogen sulphide extends far beyond the limited area being treated and defined by the jutting walls. Therefore, a treatment was utilized substantially in excess of the ten tons calculated on the basis of the sludge bucket findings, and this treatment was instituted by dumping approximately twelve tons of ferric oxide twenty-five feet northwest of the sewer outfall, and approximately fifty tons along the base of the southern rock wall between points about fifty and two hundred and fifty feet west of the sewer outlet. Analyses of the bay waters during the weeks succeeding the application of the oxide showed considerably reduced content of hydrogen sulphide (when taken at comparable tide levels, as at this sewer high tide tends to greatly reduce the hydrogen sulphide percentage in the bay waters, owing to dilution).

The annual paint damage in the city of Berkeley in the area adjacent and attributable to the hydrogen sulphide gas liberated from the sewer conduit in the region of the Virginia Street outfall has been estimated at in excess of $100,000, predicated upon the cost of repainting the affected buildings, without attempting to estimate other damages including lowered property values in the affected neighborhood. Subsequent to the treatment of this outfall in accordance with the present invention and as above described, there has been no observable paint blackening in Berkeley that could be attributed to gases from the region of the Virginia Street sewer.

The ferric oxide used in this particular application was a calcined product, varying in size from extremely fine dust (200 mesh or finer) to pieces the size of a pea. Many of the larger particles are still observable on the rocks, more particularly at higher tide levels as of the present date. The continuing control of the release of hydrogen sulphide demonstrates the continued catalytic functioning of the iron oxides originally deposited of oxidizing the hydrogen sulphide produced by the decomposing sewage to inoxious non-volatile compounds. The term "particulate bodies" as used in the claims, includes bodies of material such as sheet iron, pieces of iron, tin-plated iron can, de-tinned plate, iron turnings from machine shops, iron and steel waste material and other solid bodies presenting a surface of iron oxide.

I claim:

1. In a sewage disposal system wherein sewage is discharged into a body of water having a mud bed, the process of inhibiting the release of hydrogen sulphide formed by the interaction of organic matter in said sewage and sulphates in said water which consists in depositing on said bed of a catalytic oxidizing agent of the class consisting of iron and substantially water insoluble salts thereof which react with hydrogen sulphide to form an iron sulphide, and causing said iron sulphide to react with oxygen in the water or atmosphere to reconstitute an iron compound which will in turn again react with hydrogen sulphide whereby the original oxidizing agent will go into and out of the chemical process on each cycle to combine with and destroy hydrogen sulphide as the latter is generated.

2. The process of treating tidal land on to which sewage is discharged for inhibiting the release of hydrogen sulphide, which consists in the depositing on such land iron oxide in position for tidal washing and in sufficient quantity and distribution to effectively reduce the release of hydrogen sulphide normally formed by the interaction of such sewage and tidal water, and reacting the iron sulphide thus formed with the oxygen in the water or atmosphere to reconstitute an iron oxide and again reacting said iron oxide with the hydrogen sulphide formed on subsequent additions of sewage on said tidal land.

3. The process of treating tidal land subjected to the action of tidal water into which sewage is discharged for inhibiting the release of hydrogen sulphide from sewage sludge on such boundary, which consists in depositing iron oxide on such land in a quantity of at least two-thirds ounce of iron oxide per square foot of land to be treated, and reacting the iron sulphide thus formed with the oxygen in the water or atmosphere to form an iron oxide, again reacting said iron oxide with the hydrogen sulphide formed on subsequent additions of sewage, and from time to time adding further iron oxide to said land to replace iron oxide that may be washed away by tidal action and the like so as to maintain the distribution and concentration substantially as specified.

4. The process of treating tidal land and beaches and the like from pollution caused by discharge of sewage and organic matter on such land or neighboring areas, which consists in depositing on such land in position for tidal washing a catalytic oxidizing agent of the class consisting of iron and substantially water in-soluble salts thereof which react with hydrogen sulphide to form iron sulphide, such agent being deposited in sufficient quantities and distribution to effectively reduce the release of hydrogen sulphide normally formed by the interaction of such sewage and organic matter and tidal water, said iron sulphide in turn reacting with oxygen in the water or atmosphere to reconstitute said oxidizing agent for further reaction with hydrogen sulphide formed by subsequent additions of sewage, thereby providing a continuously reacting oxidizing agent on said land for a substantial period of time.

5. The process of treating tidal land and beaches and the like from pollution caused by discharge of sewage and organic matter onto such land or neighboring areas and which consists in depositing on such land in position for tidal washing solid particulate bodies presenting a surface of iron oxide in sufficient quantities and distribution to effectively sweeten the tidal water.

ROBERT E. CORNISH.

REFERENCES CITED

The following references are of record in the file of this patent:

UNITED STATES PATENTS

| Number | Name | Date |
| --- | --- | --- |
| 1,392,213 | Peck | Sept. 27, 1921 |
| 1,799,444 | Speer, Jr. | Apr. 7, 1931 |
| 2,167,443 | Bevan | July 25, 1939 |
| 2,171,203 | Urbain et al. | Aug. 29, 1939 |

FOREIGN PATENTS

| Number | Country | Date |
| --- | --- | --- |
| 9,819 | Great Britain | of 1900 |
| 421,643 | Great Britain | of 1934 |